US012779953B2

(12) United States Patent
Kawahara et al.

(10) Patent No.: US 12,779,953 B2
(45) Date of Patent: Nov. 3, 2026

(54) WINDOW GLASS FOR VEHICLE

(71) Applicant: AGC Inc., Tokyo (JP)

(72) Inventors: Takashi Kawahara, Tokyo (JP); Masakazu Okabe, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 18/941,849

(22) Filed: Nov. 8, 2024

(65) Prior Publication Data

US 2025/0153547 A1 May 15, 2025

(30) Foreign Application Priority Data

Nov. 15, 2023 (JP) ................................ 2023-194215

(51) Int. Cl.
*B60J 1/16* (2006.01)
*B60J 1/00* (2006.01)
*E05D 15/06* (2006.01)

(52) U.S. Cl.
CPC ................. *B60J 1/16* (2013.01); *B60J 1/007* (2013.01); *E05D 15/0621* (2013.01); *E05Y 2900/55* (2013.01)

(58) Field of Classification Search
None
See application file for complete search history.

(56) References Cited

U.S. PATENT DOCUMENTS

2021/0156183 A1* 5/2021 Kim ........................ E05C 9/045
2023/0116133 A1* 4/2023 Alam .................... E05F 15/632
296/155

FOREIGN PATENT DOCUMENTS

DE 102018210529 A1 * 1/2020 ............ E05F 11/535
EP 1516990 A1 * 3/2005 ......... E05D 15/1047
JP 2015-105087 A 6/2015

OTHER PUBLICATIONS

Machine translation of JP2015105087A.*
Machine translation of DE102018210529A1.*

* cited by examiner

*Primary Examiner* — Marcus Menezes
(74) *Attorney, Agent, or Firm* — Foley & Lardner LLP

(57) ABSTRACT

A window glass for vehicle according to an aspect of the present disclosure includes: a fixed glass with an opening formed therein, a movable glass configured to be fitted into the opening of the fixed glass; and a pair of support members and configured to vertically sandwich the movable glass therebetween and slidably support the movable glass relative to the fixed glass. Grooves are provided in the pair of support members; the pair of support members are formed of resin; at least one of the pair of support members is inclined in such a manner that a bottom surface of the groove of that support member gets closer to the other support member on a vehicle rear side; and a ratio of a height of the inclination to an overall length of the support member is not lower than 0.03% and not higher than 1.0%.

8 Claims, 8 Drawing Sheets

WINDOW GLASS FOR VEHICLE

INCORPORATION BY REFERENCE

This application is based upon and claims the benefit of priority from Japanese patent application No. 2023-194215, filed on Nov. 15, 2023, the disclosure of which is incorporated herein in its entirety by reference.

BACKGROUND

The present disclosure relates to a window glass for vehicle.

A technique in which a part of a fixed glass fixed to a vehicle is hollowed out to form an opening therein, and a movable glass is fitted into the opening has been known. The movable glass is, for example, slidably supported by a pair of support members which is roughly horizontally attached to the fixed glass.

Patent Literature 1 discloses such a technique in which a movable glass is slidably supported by a pair of support members attached to a fixed glass. Patent Literature Patent Literature 1: Japanese Unexamined Patent Application Publication No. 2015-105087

SUMMARY

In order to facilitate processing and reduce weight, the support members fixed to the fixed glass are, for example, formed of resin. However, the support members formed of resin may be distorted after being molded. Therefore, there is a problem that when the movable glass is slid, the movable glass rattles due to the distortion of the support members.

In view of the above-described problem, an object of the present disclosure is to provide a window glass for vehicle capable of preventing, when a movable glass is slid, the movable glass from rattling.

A window glass for vehicle according to an aspect of the present disclosure comprises:

- a fixed glass with an opening formed therein, configured to be fixed to a vehicle;
- a movable glass configured to be fitted into the opening of the fixed glass; and
- a pair of support members configured to vertically sandwich the movable glass therebetween and slidably support the movable glass relative to the fixed glass, wherein
- a groove extending in a direction in which the movable glass is slid is formed in each of the pair of support members,
- the pair of support members are formed of resin,
- at least one of the pair of support members is inclined in such a manner that a bottom surface of the groove of that support member gets closer to the other support member on a vehicle rear side, and
- a ratio of a height of the inclination of the bottom surface of the groove to an overall length of the support member is not lower than 0.03% and not higher than 1.0%.

According to the present disclosure, it is possible to prevent, when s movable glass is slid, the movable glass from rattling.

The above and other objects, features and advantages of the present disclosure will become more fully understood from the detailed description given hereinbelow and the accompanying drawings.

DESCRIPTION OF EMBODIMENTS

Figure 1:
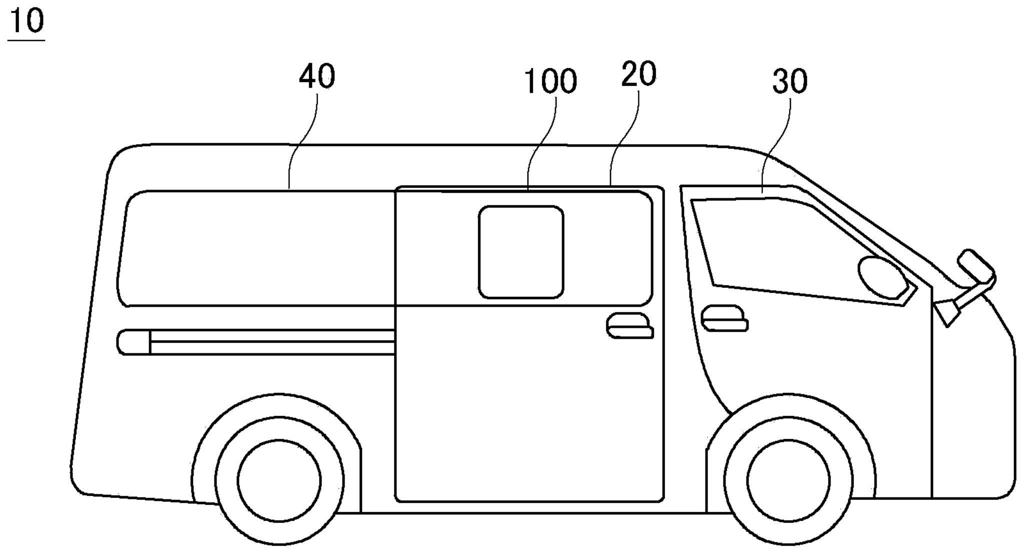
FIG. 1 shows an example of a vehicle including window glasses for vehicle according to a first embodiment.

Embodiments according to the present disclosure will be described hereinafter with reference to the drawings. Note that for ease of understanding, the scale of each part in the drawings may differ from the actual scale. Regarding the directions such as parallel, right angle, orthogonal, horizontal, vertical, up/down, and left/right, deviations to such a degree that the effect of embodiments is not impaired are allowed. The shapes of corners are not limited to right angles, but they may be rounded in arcuate shapes. The parallel, right angle, orthogonal, horizontal, and vertical may include roughly parallel, roughly right angle, roughly orthogonal, roughly horizontal, and roughly vertical, respectively. Further, in this specification, the term "roughly" means a state where the shape is the same and/or the size is the same to the human eyes.

First Embodiment

FIG. 1 shows an example of a vehicle 10 including a window glass for vehicle 100 according to an embodiment. The vehicle 10 is a minivan, and includes a slide door 20 and a side door 30 on a side thereof. The window glass for vehicle 100 is provided in the slide door 20. In this embodiment, the front/rear, the right/left, and the up/down correspond to the front/rear, the right/left, and the up/down, respectively, of the vehicle 10.

As shown in FIG. 1, the vehicle 10 includes a front opening (not shown) in a front part of each of the left and right sides of the vehicle. A side door 30 is attached to each of the front openings in such a manner that it can be opened and closed. A central opening (not shown) is provided on each of the left and right sides of the central part of the vehicle 10. A slide door 20 is attached to each of the central openings in such a manner that it can be opened and closed in the front/rear direction of the vehicle 10. The example shown in FIG. 1 shows a state where the slide door 20 is closed. The slide door 20 is attached to the vehicle so that it can be slid toward the rear of the vehicle. Therefore, the slide door 20 can be opened by sliding the slide door 20 toward the rear of the vehicle.

A window glass for vehicle 100 is attached to the slide door 20. For example, as shown in FIG. 1, the window glass for vehicle 100 may be designed so that it is continuous with a window glass 40 provided in the rear part of the vehicle 10.

Figure 2:
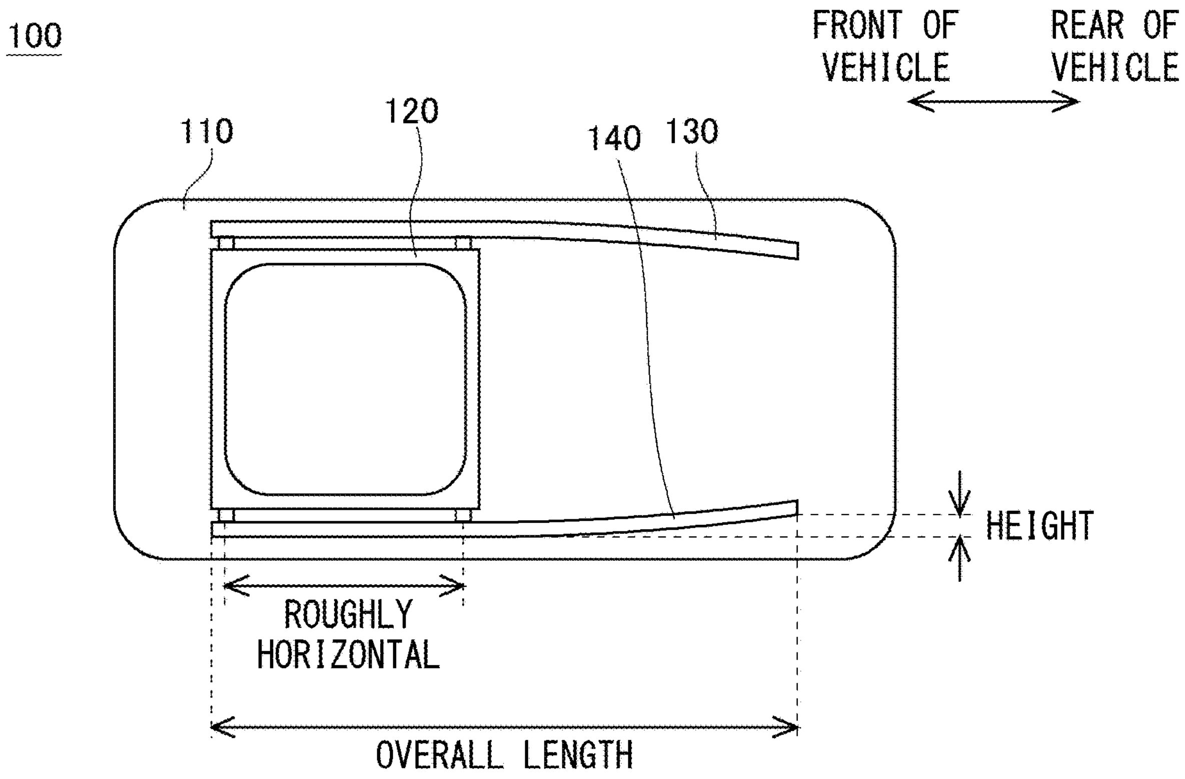
FIG. 2 shows a structure of a window glass for vehicle according to the first embodiment.

FIG. 2 is a diagram showing a structure of the window glass for vehicle 100 according to this embodiment, and is a diagram of the window glass for vehicle 100 provided on the right side of the vehicle 10 as viewed from the inside of the vehicle. The window glass for vehicle 100 includes a fixed glass 110, a movable glass 120, and support members 130 and 140.

The fixed glass 110 is a rectangular glass plate and is fixed to the slide door 20. As shown in FIG. 2, the fixed glass 110 may have, for example, a horizontally long shape. The fixed glass 110 includes a small window (not shown). The small window is a rectangular opening having rounded corners, and its upper and lower edges are roughly horizontal.

The movable glass 120 is fitted into an opening provided in the fixed glass 110 and is movable relative to the fixed glass 110 and the slide door 20.

Figure 3:
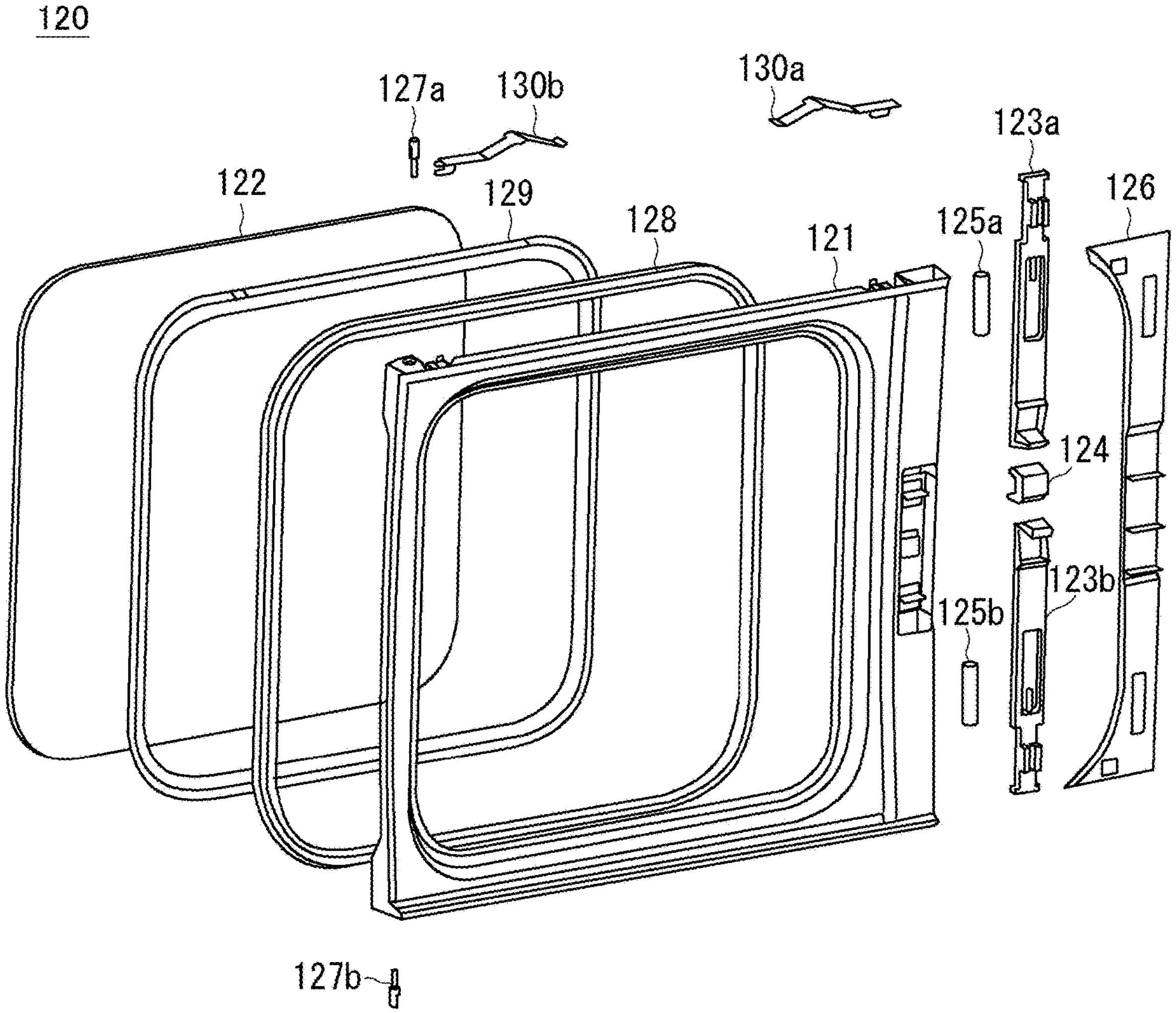
FIG. 3 is an exploded view of a part of a movable glass.

FIG. 3 is an exploded view of a part of the movable glass 120, and is a view of the movable glass 120 provided on the right side of the vehicle 10 as viewed from the inside of the vehicle. As shown in FIG. 3, the movable glass 120 includes a frame 121, a glass plate 122, rods 123*a* and 123*b*, a cap 124, springs 125*a* and 125*b*, a cover 126, pins 127*a* and 127*b*, a seal member 128, a molding 129, and leaf springs 130*a* and 130*b*. The frame 121 is a rectangular member with an opening formed in the center thereof. The glass plate 122 is a rectangular glass plate. The glass plate 122, which is integrated with, e.g., assembled into, the molding 129, is fitted into the opening provided in the frame 121.

The rods 123*a* and 123*b* are rod-like or plate-like members extending in the up/down direction, and are attached to the end of the frame 121 on the vehicle rear side. The upper end of the rod 123*a* is slidably fitted into a groove 132 (FIG. 5) provided in the support member 130. A knob is provided at the lower end of the rod 123*a*. The lower end of the rod 123*b* is slidably fitted into a groove 142 (FIG. 4) provided in the support member 140. A knob is provided at the upper end of the rod 123*b*. The rods 123*a* and 123*b* are attached to each other in a straight line so that their ends, at which the knobs are provided, are in contact with each other. The rods 123*a* and 123*b* are covered by the frame 121, the cap 124, and the cover 126. The frame 121 is a member for covering the upper and lower parts of the rods 123*a* and 123*b* as viewed from the inside of the vehicle. The cap 124 is a member for covering parts of the rods 123*a* and 123*b* near the knobs thereof. The cover 126 is a member for covering the whole rods 123*a* and 123*b* as viewed from the outside of the vehicle.

To slide the movable glass 120, a user, e.g., a driver or a passenger, moves the movable glass 120 toward the front or rear of the vehicle while pinching the knobs of the rods 123*a* and 123*b*. When the knobs of the rods 123*a* and 123*b* are pinched, the rods 123*a* and 123*b* come off from the bottom surfaces of the grooves 132 and 142 of the support members 130 and 140. Therefore, when the movable glass 120 is slid, the resistances caused between the rods 123*a* and 123*b* and the support members 130 and 140 are small.

The springs 125*a* and 125*b* are attached to the rods 123*a* and 123*b*, respectively. When the knobs of the rods 123*a* and 123*b* are pinched, the springs 125*a* and 125*b* are made to contract. When the knobs of the rods 123*a* and 123*b* are released, the springs 125*a* and 125*b* return from their contracted states to the original states. Therefore, when the knobs of the rods 123*a* and 123*b* are released, the rods 123*a* and 123*b* return to their original positions by the restoring forces of the springs 125*a* and 125*b*.

In the example shown in FIG. 3, the rods 123*a* and 123*b* are integrally molded by using resin. By integrally molding the rods 123*a* and 123*b*, the tenacity of the rods 123*a* and 123*b* is improved. Note that the rods 123*a* and 123*b* may be formed by using a material other than resin, and/or may be formed by using a plurality of members. Each of the rods 123*a* and 123*b* may be, for example, a component in which a plurality of metal members are connected with each other by covering them with resin.

The pins 127*a* and 127*b* are members that are attached to the frame 121 and are in contact with the support members 130 and 140, respectively. The pin 127*a* is attached to the upper edge of the frame 121 on the vehicle front side, and is slidably fitted into the groove 131 provided in the support member 130. The pins 127*b* is attached to the lower edge of the frame 121 on the vehicle front side, and is slidably fitted into the groove 141 provided in the support member 140.

As an example, the seal member 128 is sandwiched between the frame 121 and the fixed glass 110. The seal member 128 seals a gap between the frame 121 and the fixed glass 110. The molding 129 is attached to the peripheral edge of the glass plate 122. As a result, the end face of the glass plate 122 is covered and concealed, so that the design of the movable glass 120 as viewed from the outside of the vehicle can be improved. The leaf springs 130*a* and 130*b* are attached to the upper edge of the frame 121. Each of the leaf springs 130*a* and 130*b* is an elastic body that contracts when a force is applied thereto in the up/down direction.

The support members 130 and 140 serve as rails that slidably support the movable glass 120. The support members 130 and 140 will be described hereinafter with reference to FIGS. 4 and 5.

Figure 4:
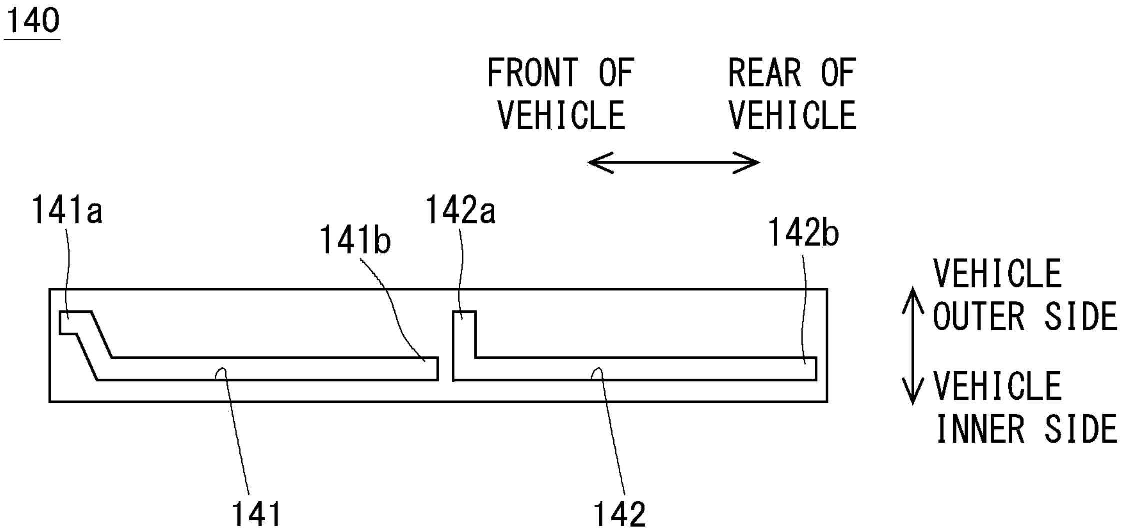
FIG. 4 shows a structure of a support member.

FIG. 4 is a diagram showing the structure of the support member 140, and is a view of the support member 140 as viewed downward from above. As shown in FIG. 4, the grooves 141 and 142 are provided on the upper surface of the support member 140. The grooves 141 and 142 are grooves provided along the sliding direction of the movable glass 120. The pin 127*b* is slidably fitted into the groove 141. The rod 123*b* is slidably fitted into the groove 142.

A part of the bottom surface of the groove 141 closest to the front of the vehicle is referred to as a completely-closed position 141*a*. A part of the bottom surface of the groove 142 closest to the front of the vehicle is referred to as a completely-closed position 142*a*. When the pin 127*b* is at the completely-closed position 141*a* and the rod 123*b* is at the completely-closed position 142*a*, the movable glass 120 is in a state where it is fitted into the opening of the fixed glass 110, i.e., in a state where the small window is completely closed. A part of the bottom surface of the groove 141 closest to the rear of the vehicle is referred to as a completely-opened position 141*b*. A part of the bottom surface of the groove 142 closest to the rear of the vehicle is referred to as a completely-opened position 142*b*. When the pin 127*b* is positioned at the completely-opened position 141*b* and the rod 123*b* is positioned at the completely-opened position 142*b*, the movable glass 120 in a state where it does not overlap the opening of the fixed glass 110 at all, i.e., in a state where the small window is completely opened. Note that the window glass for vehicle can be used in a state where a part of the movable glass 120 overlaps the opening of the fixed glass 110, i.e., the small window is partially opened.

As shown in FIG. 4, a part of the groove 141 at or near the completely-closed position 141*a* may be disposed on the vehicle outer side relative to the other parts of the groove 141. Further, a part of the groove 142 at or near the completely-closed position 142*a* may be disposed on the vehicle outer side relative to the other parts of the groove 142.

Figure 5:
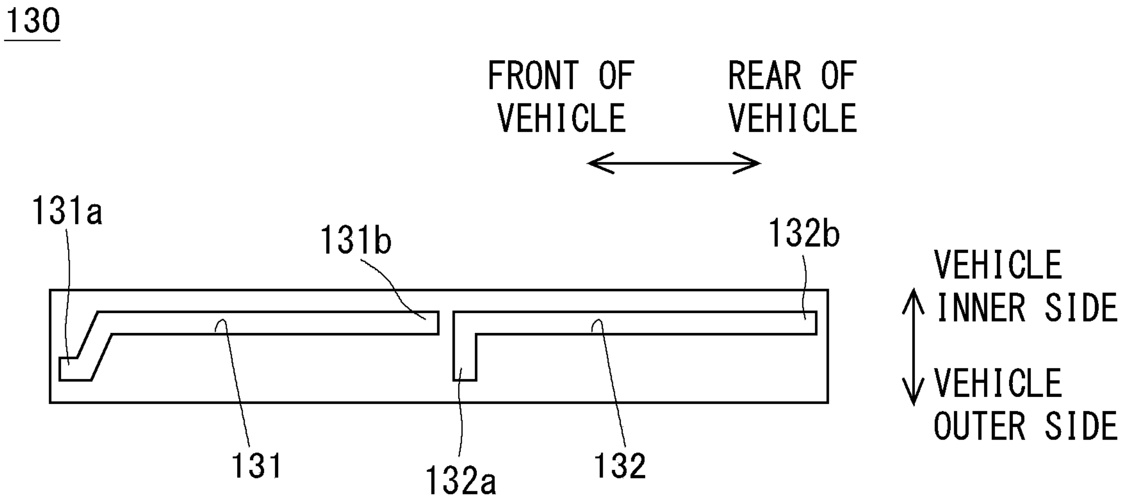
FIG. 5 shows a structure of a support member.

FIG. 5 is a diagram showing a structure of the support member 130, and is a view of the support member 130 as viewed upward from below. As shown in FIG. 5, the grooves 131 and 132 having shapes conforming to those of the grooves 141 and 142 provided on the upper surface of the support member 140 are provided on the lower surface of the support member 130. The pin 127*a* is slidably fitted into the groove 131. The rod 123*a* is slidably fitted into the groove 132.

A part of the bottom surface of the groove 131 closest to the front of the vehicle is referred to as a completely-closed position 131*a*. A part of the bottom surface of the groove 132 closest to the front of the vehicle is referred to as a completely-closed position 132*a*. A part of the bottom surface of the groove 131 closest to the rear of the vehicle is referred to as a completely-opened position 131*b*. A part of the bottom surface of the groove 132 closest to the rear of the vehicle is referred to as a completely-opened position 132*b*.

Note that the shape of the grooves provided in the support members 130 and 140 are not limited to the examples shown in FIGS. 4 and 5. For example, a single groove extending from the front end of the vehicle to the rear end thereof may be provided in each of the support members 130 and 140.

The support members 130 and 140 will be further described by referring to FIG. 2 again. The support members 130 and 140 are attached to the fixed glass 110 so that the movable glass 120 is horizontal when the small window is completely closed. Specifically, the support members 130 and 140 are attached to the fixed glass 110 so that the heights of the completely-closed positions 131*a* and 132*a* are roughly equal to each other, and the heights of the completely-closed positions 141*a* and 142*a* are roughly equal to each other.

The support members 130 and 140 are formed of resin. The resin of which the support members 130 and 140 are formed may shrink during or after the processing. Therefore, when a support member with a groove formed therein is molded of resin, both ends of the support member may protrude toward the side opposite to the side on which the groove is provided, and the central part of the support member may be distorted so as to protrude toward the side on which the groove is provided. As a result, the support member may be warped into a bow shape. If the support member that is warped into the bow shape is attached to the fixed glass 110 so that the movable glass 120 is horizontal when the small window is completely closed, the distance between the bottom surfaces of the grooves provided in the pair of support members on the vehicle rear side becomes larger than that on the vehicle front side. Therefore, when the movable glass 120 is slid toward the vehicle rear side, the movable glass 120 is likely to rattle.

Therefore, in the example shown in FIG. 2, each of the support members 130 and 140 is inclined in such a manner that the bottom surface of the groove of that support member gets closer to the other support member on the vehicle rear side. By having such inclinations, the support members 130 and 140 compensate for the bow-shaped warp which is caused by the fact that they are formed of resin. Even when the support members 130 and 140 are attached to the fixed glass 110 so that the movable glass 120 is horizontal when the small window is completely closed, the distance between the bottom surfaces of the grooves formed in the pair of support members does not increase on the vehicle rear side. Therefore, the movable glass 120 is prevented from rattling which would otherwise occur when the movable glass 120 is slid toward the vehicle rear side.

In order to sufficiently compensate for the distortion of the support members 130 and 140, the ratio of the height of the inclination of the bottom surface of each of the grooves 132 and 142 to the overall length of a respective one of the support members 130 and 140 is 0.03% or higher, preferably 0.04% or higher, and more preferably 0.10% or higher. In order to reduce the resistances that are caused when the support members 130 and 140 are slid, the ratio of the height of the inclination of the bottom surface of each of the grooves 132 and 142 to the overall length of a respective one of the support members 130 and 140 is 1.0% or lower, preferably 0.65% or lower, more preferably 0.50% or lower, still more preferably 0.40% or lower, still more preferably 0.30% or lower, and particularly preferably 0.25% or lower. Note that the overall length of each of the support members 130 and 140 is the length from the end of the support member on the vehicle front side to the end thereof on the vehicle rear side. Further, the heights of the inclinations of the bottom surfaces of the grooves 132 and 142 are the heights of the support members 130 and 140 at the completely-opened positions 132*b* and 142*b*, respectively, relative to the heights of the support members 130 and 140 at the completely-closed positions 132*a* and 142*a*, respectively. Note that the overall lengths of the support members and the heights of the inclinations of the bottom surfaces of the grooves in second and third embodiments (which will be described later) are the same as those in the first embodiment.

The overall length of each of the support members 130 and 140 is, for example, not shorter than 800 mm and not longer than 1,000 mm. In order to sufficiently compensate for the distortion of the support members 130 and 140, the heights of the inclinations of the bottom surfaces of the grooves 132 and 142 are preferably not lower than 0.3 mm and not higher than 5.0 mm, more preferably not lower than 0.3 mm and not higher than 3.0 mm, and more preferably not lower than 1.0 mm and not higher than 2.0 mm.

The pair of support members 130 and 140 support the movable glass 120 roughly horizontally when the movable glass 120 is fitted into the opening of the fixed glass 110 and the opening is thereby completely closed. Therefore, the movable glass 120 is prevented from rattling in the state where the small window is completely closed.

In the example shown in FIG. 2, each of the support members 130 and 140 is inclined in such a manner that the bottom surface of the groove of that support member gets closer to the other support member on the vehicle rear side. However, only one of the support members 130 and 140 may be inclined in such a manner that the bottom surface of the groove of that support member gets closer to the other support member on the vehicle rear side. Further, only the bottom surface of the groove of at least one of the support members 130 and 140 may be inclined, or the whole support member is inclined so as to get closer to the other support member. Alternatively, the surface on the side on which the groove is provided, i.e., the surface on the side on which the other support member is located, is inclined so as to get closer to the other support member.

Figure 6:
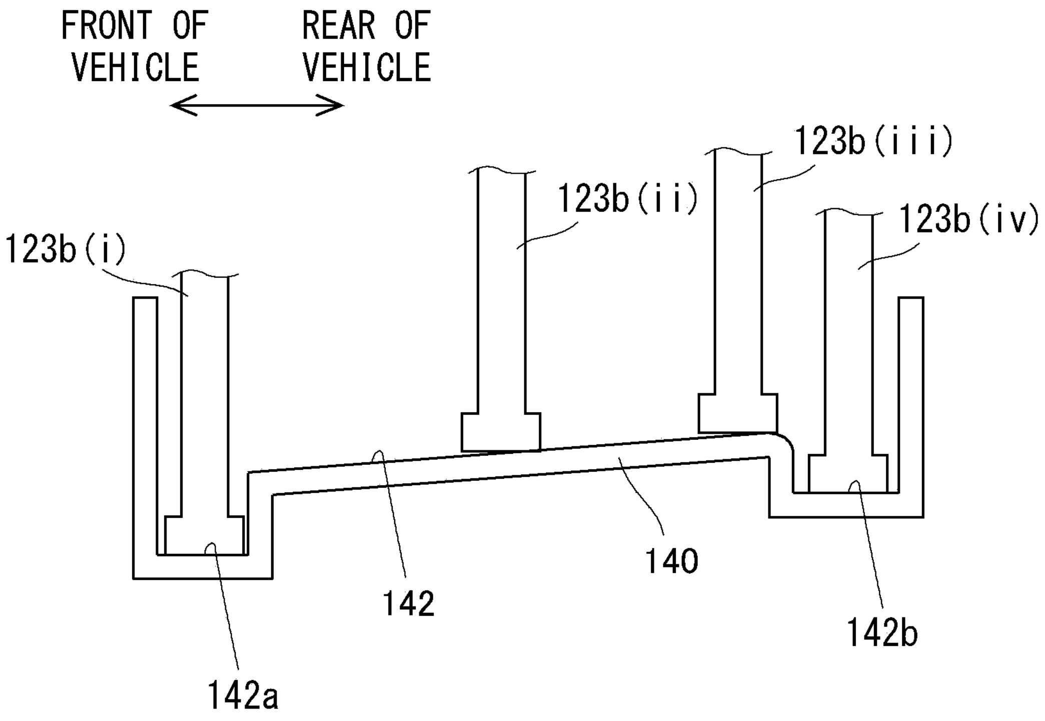
FIG. 6 is a schematic cross-sectional view of a part of a support member included in the window glass for vehicle according to the first embodiment.

Next, an inclination provided on each of the support members 130 and 140 will be further described with reference to FIG. 6. FIG. 6 is a schematic cross-sectional view of a part of the support member 140 provided in the window glass for vehicle 100 according to this embodiment, and schematically shows a cross section when the support member 140 is cut along the direction in which the groove 142 extends. A rod position 123*b*(i) indicates the position of the rod 123*b* when the small window is completely closed. A rod position 123*b*(ii) indicates the position of the rod 123*b* when the small window is opened halfway. A rod position 123*b* (iii) indicates the position of the rod 123*b* when the small window is opened about 90%, i.e., when the small window is opened to a position immediately before the completely-opened position. A rod position 123*b*(iv) indicates the position of the rod 123*b* when the small window is completely opened.

As shown in FIG. 6, steps, i.e., differences in level, are provided on the bottom surface of the groove 142 so that the bottom surface is lower at the completely-closed position 142*a* and the completely-opened position 142*b* than it is at positions other than the completely-closed position 142*a* and the completely-opened position 142*b*. Therefore, when the small window is completely closed or completely opened, the rod 123*b* is caught by the steps provided on the bottom surface of the groove 142, so that the sliding of the movable glass 120 is restricted. That is, the movable glass 120 is locked. For example, when the small window is opened from the completely-closed state, the movable glass 120 is slid toward the vehicle rear side while lifting the rod 123*b* by pinching knobs provided in the rods 123*a* and 123*b*.

As shown in FIG. 6, the steps may be provided on the bottom surface of the groove 142 so that the rod position 123*b*(i) is lower than the rod position 123*b*(iv). In this case, the spring 125*b* attached to the rod 123*b* is made to contract more in the completely-opened state that in the completely-closed state. That is, the rod 123*b* is more strongly pressed against the bottom surface of the groove 142, i.e., is locked more firmly, than in the completely-opened state than in the completely-closed state.

As shown in FIG. 6, in the support member 140, an inclination is provided in such a manner that the bottom surface of the groove 142 gets closer to the other support member 130 toward the vehicle rear side, i.e., as the position on the bottom surface gets closer to the vehicle rear side, over the whole bottom surface except for the completely-closed position 142*a* and the completely-opened position 142*b*. That is, the rod position 123*b*(iii) is higher than the rod position 123*b*(ii), and its distance from the other support member 130 is short. Therefore, it is possible to prevent, when the movable glass 120 is slid to the vehicle rear side, the movable glass 120 from rattling. Further, as the movable glass 120 is slid toward the vehicle rear side, the support members 130 and 140 get closer to each other, so that the resistances increase during the sliding. Therefore, it is possible to reduce the momentum with which the rods 123*a* and 123*b* come into contact with the ends of the support members 130 and 140 on the vehicle rear side when the small window is completely opened. As described above, in this embodiment, when the rods 123*a* and 123*b* come into contact with the ends of the support members 130 and 140 on the vehicle rear side, it is possible to reduce the load, i.e., momentum, exerted on the rods 123*a* and 123*b*, thereby to prevent the rods 123*a* and 123*b* from being damaged.

Second Embodiment

Figure 7:
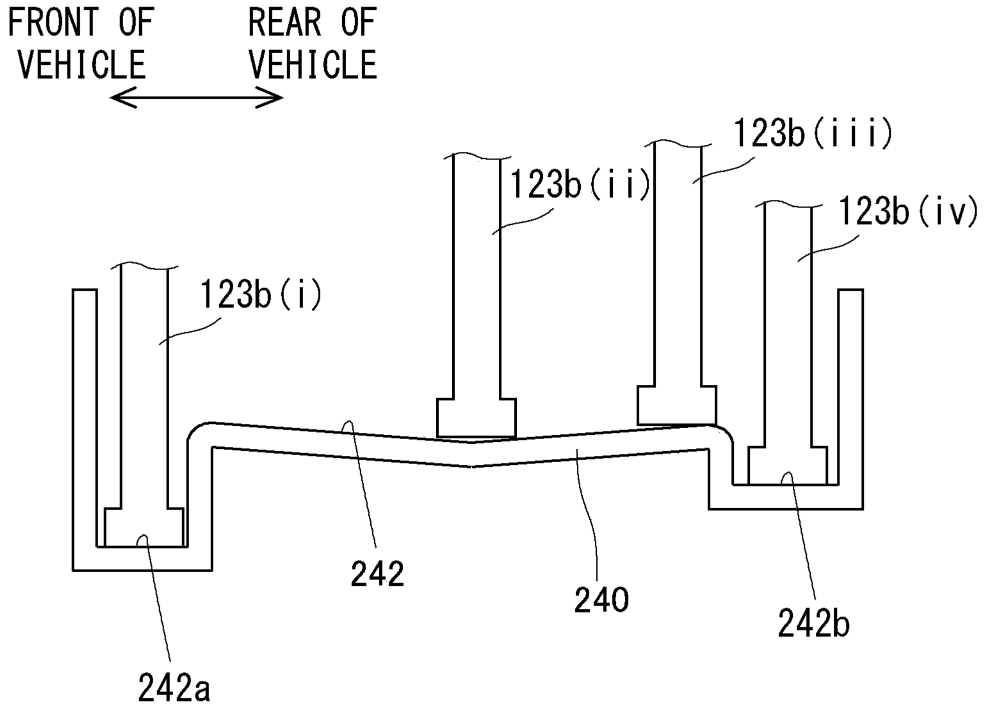
FIG. 7 is a schematic cross-sectional view of a part of a support member provided in a window glass for vehicle according to a second embodiment.

FIG. 7 is a schematic cross-sectional view of a part of a support member 240 provided in a window glass for vehicle 100 according to a second embodiment, and schematically shows a cross section when the support member 240 is cut along the direction in which the groove 242 extends. In this embodiment, an inclination having a V-shape in cross section is provided in the support member 240. In this embodiment, members other than the support member 240 have the same structures as those in the first embodiment, and therefore descriptions thereof will be omitted.

As shown in FIG. 7, in this embodiment, the groove 242 has a V-shape in cross section so that, at positions on the bottom surface of the groove 242 other than the completely-closed position 242*a* and the completely-opened position 242*b*, both ends of the bottom surface in the vehicle front/rear direction get closer to the other support member 130. That is, in the support member 240, two inclinations are provided in such a manner that the bottom surface of the groove gets closer to the other support member 130 from the central part of the groove 242 toward the vehicle front side or the vehicle rear side, i.e., as the position on the bottom surface gets closer, from the central part, to the vehicle front side or the vehicle rear side. Note that a groove having a shape conforming to the groove 242 provided in the support member 240 may be provided in the support member 130.

Since the support member 240 has a V-shape in cross section, it is possible to prevent, when the movable glass 120 is slid to the vehicle front side or the vehicle rear side, the movable glass 120 from rattling. Further, as the movable glass 120 is slid toward the vehicle front side or the vehicle rear side, the support members 130 and 240 get closer to each other, so that the resistances increase during the sliding. Therefore, it is possible to reduce the momentum with which the rods 123*a* and 123*b* come into contact with the ends of the support members 130 and 240 on the vehicle rear side when the small window is completely closed or completely opened. As described above, in this embodiment, when the rods 123*a* and 123*b* come into contact with the ends of the support members 130 and 240 on the vehicle front side or the vehicle rear side, it is possible to reduce the load, i.e., momentum, exerted on the rods 123*a* and 123*b*, thereby to prevent the rods 123*a* and 123*b* from being damaged.

Third Embodiment

Figure 8:
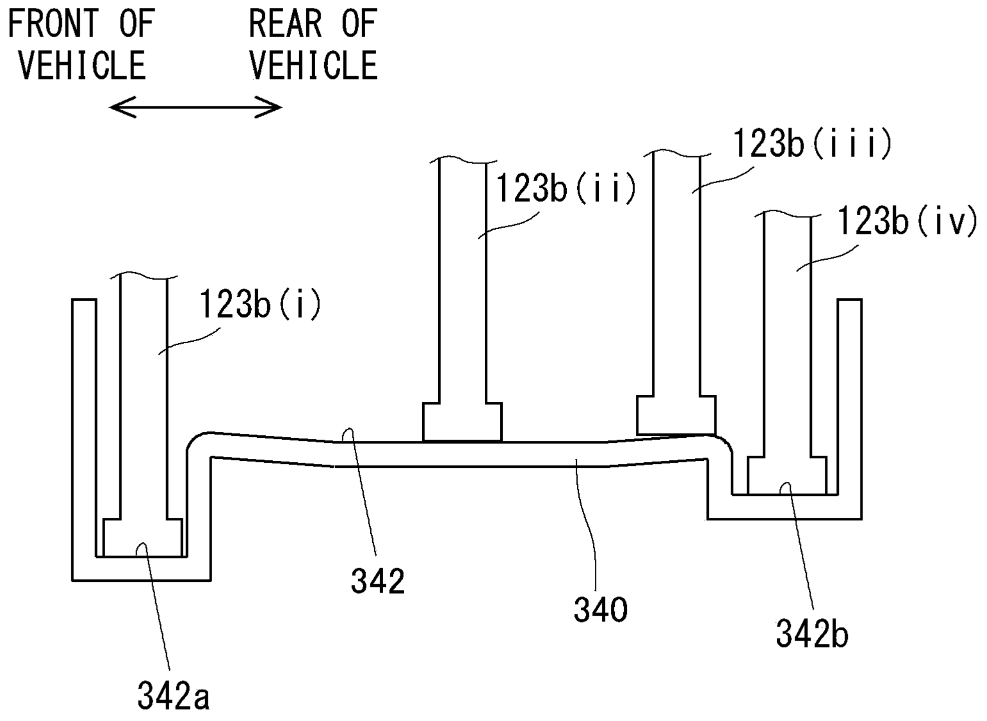
FIG. 8 is a schematic cross-sectional view of a part of a support member provided in a window glass for vehicle according to a third embodiment.

FIG. 8 is a schematic cross-sectional view of a part of a support member 340 provided in a window glass for vehicle 100 according to a third embodiment, and schematically shows a cross section when the support member 340 is cut along the direction in which the groove 342 extends. In this embodiment, two inclinations are provided in the support member 340. In this embodiment, members other than the support member 340 have the same structures as those in the first and second embodiments, and therefore descriptions thereof will be omitted.

As shown in FIG. 8, in this embodiment, two inclinations are provided on the bottom surface of the groove 342 so that, at positions on the bottom surface other than the completely-closed position 342*a* and the completely-opened position 342*b*, both ends of the bottom surface of the groove 342 in the vehicle front/rear direction get closer to the other support member 130. That is, in the support member 340, the central part of the groove 342 is roughly horizontal, and two inclinations are provided in such a manner that the bottom surface of the groove gets closer to the other support member 130 from the central part of the groove 342 toward the vehicle front side or the vehicle rear side, i.e., as the position on the bottom surface gets closer, from the central part, to the vehicle front side or the vehicle rear side. This embodiment provides advantageous effects similar to those in the second embodiment. Note that a groove having a shape conforming to the groove 342 provided in the support member 340 may be provided in the support member 130.

Although the present disclosure has been described above with reference to the above-described embodiments, the present disclosure is not limited to the configurations of the above-described embodiments. Needless to say, the present disclosure includes various modifications, corrections, and combinations that can be made by a person skilled in the art within the scope of the claims.

The first, second and third embodiments can be combined as desirable by one of ordinary skill in the art.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A window glass for a vehicle comprising: a fixed glass with an opening formed therein, configured to be fixed to the vehicle; a movable glass configured to be fitted into the opening of the fixed glass; and a pair of support members configured to vertically sandwich the movable glass therebetween and slidably support the movable glass relative to the fixed glass, wherein a groove extending in a direction, in which the movable glass is slid, is formed in each of the pair of support members, the pair of support members are formed of resin, at least one of the pair of support members has, from a central part of the groove toward a rear side of the vehicle along a direction in which the movable glass is slid entirely in a single plane, an inclination such that a bottom surface of the groove of that support member gets closer to the other support member, and a ratio of a height of the inclination of the bottom surface of the groove for the at least one of the pair of support members that is inclined to an overall length of the respective support member is not lower than 0.03% and not higher than 1.0%.

2. The window glass for the vehicle according to claim 1, wherein the height of the inclination is not lower than 0.3 mm and not higher than 5 mm.

3. The window glass for the vehicle according to claim 1, wherein the pair of support members support the movable glass roughly horizontally when the opening of the fixed glass is completely closed by fitting the movable glass into the opening.

4. The window glass for the vehicle according to claim 1, wherein the pair of support members are inclined in such a manner that the bottom surface of the groove of the at least one of the support members gets closer to the other support member on the vehicle rear side.

5. The window glass for the vehicle according to claim 1, wherein the fixed glass includes a small window, the small window is a rectangular opening having rounded corners, and upper and lower edges being roughly horizontal, a step is provided on the bottom surface of the groove of the at least one of the pair of support members so that the bottom surface of the groove of the at least one of the pair of support members is lower at a completely-closed position of the small window and a completely-opened position of the small window than at positions of the small window other than the completely-closed position and the completely-opened position.

6. The window glass for the vehicle according to claim 1, wherein the fixed glass includes a small window, the small window is a rectangular opening having rounded corners, and upper and lower edges being roughly horizontal, the bottom surface of the groove of the at least one of the pair of support members has a V-shape in cross section so that, at positions on the bottom surface of the groove other than a completely-closed position of the small window and a completely-opened position of the small window, both ends of the bottom surface of the groove in a vehicle front/rear direction get closer to the other support member.

7. The window glass for the vehicle according to claim 1, wherein the fixed glass includes a small window, the small window is a rectangular opening having rounded corners, and upper and lower edges being roughly horizontal, two inclinations are provided in the bottom surface of the groove of the at least one of the pair of support members so that, at positions on the bottom surface of the groove other than a completely-closed position of the small window and a completely-opened position of the small window, both ends of the bottom surface of the groove in a vehicle front/rear direction get closer to the other support member.

8. The window glass for the vehicle according to claim 1, wherein the movable glass comprises a frame and a pair of rods, the frame being a rectangular member with an opening at a center thereof, and the pair of rods being configured to be attached to an end of the frame on the vehicle rear side, and upper ends or lower ends of the pair of rods are slidably fitted into the grooves provided in the pair of support members.

* * * * *